(12) United States Patent
Yamada et al.

(10) Patent No.: US 9,815,995 B2
(45) Date of Patent: Nov. 14, 2017

(54) INK FOR INK-JET PRINTING, PRINTED CYLINDRICAL CONTAINERS AND METHOD FOR PRODUCING THE SAME

(71) Applicants: Koji Yamada, Yokohama (JP); Kenji Hayashi, Yokohama (JP); Yukiko Saito, Yokohama (JP); Hiroshi Shimomura, Osaka (JP)

(72) Inventors: Koji Yamada, Yokohama (JP); Kenji Hayashi, Yokohama (JP); Yukiko Saito, Yokohama (JP); Hiroshi Shimomura, Osaka (JP)

(73) Assignees: TOYO SEIKAN GROUP HOLDINGS, LTD., Tokyo (JP); TOKAN MATERIAL TECHNOLOGY CO., LTD., Osaka (JP)

( * ) Notice: Subject to any disclaimer, the term of this patent is extended or adjusted under 35 U.S.C. 154(b) by 593 days.

(21) Appl. No.: 14/373,394

(22) PCT Filed: Jan. 31, 2013

(86) PCT No.: PCT/JP2013/052161
§ 371 (c)(1),
(2) Date: Jul. 21, 2014

(87) PCT Pub. No.: WO2013/115302
PCT Pub. Date: Aug. 8, 2013

(65) Prior Publication Data
US 2015/0010722 A1    Jan. 8, 2015

(30) Foreign Application Priority Data
Feb. 3, 2012   (JP) ................. 2012-021849

(51) Int. Cl.
*C09D 11/36* (2014.01)
*C09D 11/10* (2014.01)
(Continued)

(52) U.S. Cl.
CPC ............... *C09D 11/36* (2013.01); *B41J 2/01* (2013.01); *B41M 5/0088* (2013.01);
(Continued)

(58) Field of Classification Search
CPC ....... C09D 11/10; C09D 11/36; C09D 11/322; C09D 11/38; C08K 13/02; B41J 2/01;
(Continued)

(56) References Cited

U.S. PATENT DOCUMENTS 4,210,566 A    7/1980   Murray
4,680,058 A *   7/1987   Shimizu ................. C09D 11/36
                                                                           106/31.86
(Continued)

FOREIGN PATENT DOCUMENTS

EP      2143769 A1    1/2010
EP      2154210 A2    2/2010
(Continued)

OTHER PUBLICATIONS

English translation of the Written Opinion of the International Search Authority dated Mar. 12, 2013 for PCT/JP2013/052161; 5 pages.*

(Continued)

*Primary Examiner* — Helene Klemanski
(74) *Attorney, Agent, or Firm* — Sughrue Mion, PLLC

(57) ABSTRACT

An ink for ink-jet printing used for ink-jet printing images onto the ink non-absorptive surfaces of cylindrical containers, and comprising at least a water-soluble solvent, a coloring material, a surfactant, a thickener and/or a binder resin, the coloring material being contained in an amount of (Continued)

5 to 20% by weight, the surfactant in an amount of 0.1 to 5% by weight, the thickener in an amount of not more than 10% by weight, and the binder resin being contained in an amount of not more than 30% by weight. Owing to its ink-jet printability, the ink for ink-jet printing of the invention can be favorably used for printing images on the non-absorptive cylindrical containers such as seamless cans that are used for containing beverages and foods.

12 Claims, 6 Drawing Sheets

(51) Int. Cl.
  *C09D 11/322* (2014.01)
  *C09D 11/38* (2014.01)
  *C08K 13/02* (2006.01)
  *B41J 2/01* (2006.01)
  *B41M 5/00* (2006.01)
  *B41M 7/00* (2006.01)

(52) U.S. Cl.
  CPC ............ *B41M 7/009* (2013.01); *C08K 13/02* (2013.01); *C09D 11/10* (2013.01); *C09D 11/322* (2013.01); *C09D 11/38* (2013.01); Y10T 428/1352 (2015.01)

(58) Field of Classification Search
  CPC  B41M 5/0088; B41M 7/009; Y10T 428/1352
  USPC ......... 106/31.05, 31.06, 31.27, 31.37, 31.58, 106/31.59, 31.6, 31.69, 31.86, 31.89; 347/21; 428/35.7
  See application file for complete search history.

(56) References Cited

U.S. PATENT DOCUMENTS

| | | | | |
|---|---|---|---|---|
| 7,726,799 | B2* | 6/2010 | Soroker | C09D 11/36 106/31.6 |
| 8,256,884 | B2* | 9/2012 | Wheeler | C09D 11/38 106/31.27 |
| 8,586,656 | B2* | 11/2013 | Shiotani | C09D 11/30 523/160 |
| 8,702,218 | B2 | 4/2014 | Ohta et al. | |
| 8,899,718 | B2* | 12/2014 | Yamada | B41M 5/0088 347/20 |
| 8,920,552 | B2* | 12/2014 | Robertson | C09D 11/38 106/31.58 |
| 9,259,952 | B2* | 2/2016 | Yamada | B41M 5/0088 |
| 2002/0018850 | A1 | 2/2002 | Yamazaki et al. | |
| 2006/0137548 | A1 | 6/2006 | Vetter | |
| 2007/0123607 | A1* | 5/2007 | King | C09D 11/322 523/160 |
| 2008/0006175 | A1* | 1/2008 | King | C09D 11/36 106/31.6 |
| 2008/0182083 | A1 | 7/2008 | Oyanagi et al. | |
| 2009/0246377 | A1 | 10/2009 | Robertson et al. | |
| 2011/0234727 | A1* | 9/2011 | Aoki | B41M 7/009 347/102 |
| 2011/0234728 | A1* | 9/2011 | Aoki | C09D 11/322 347/102 |
| 2012/0006225 | A1 | 1/2012 | Tsukiana et al. | |
| 2013/0310496 | A1* | 11/2013 | Shiotani | C09D 11/36 524/111 |

FOREIGN PATENT DOCUMENTS

| | | |
|---|---|---|
| EP | 2452988 A1 | 5/2012 |
| JP | 55-115478 A | 9/1980 |
| JP | 59-041370 A | 3/1984 |
| JP | 2002-019260 A | 1/2002 |
| JP | 2004-42464 A | 2/2004 |
| JP | 2005-531428 A | 10/2005 |
| JP | 2006-96381 A | 4/2006 |
| JP | 2007-83565 A | 4/2007 |
| JP | 2008-62455 A | 3/2008 |
| JP | 2008-297446 A | 12/2008 |
| JP | 2010-143200 A | 7/2010 |
| JP | 2011-195763 A | 10/2011 |
| JP | 2012-17436 A | 1/2012 |
| JP | 5020930 B2 * | 9/2012 |
| WO | 2005040291 | 5/2005 |
| WO | 2007/094252 A1 | 8/2007 |
| WO | 2008023812 A1 | 2/2008 |
| WO | WO 2012/053406 * | 4/2012 |
| WO | WO 2012/147695 A1 * | 11/2012 |

OTHER PUBLICATIONS

Product Data Sheet for TSF4445; Momentive Performance Materials Japan LLC; http://www.momentive.com; no date available; 3 pages.*
English translation of JP 5020930, Sep. 2012; 11 pages.*
International Search Report for PCT/JP2013/052161 dated Mar. 12, 2013.
Communication dated Nov. 22, 2016, issued by the Japan Patent Office in corresponding Japanese Application No. 2013-016574.
Communication dated Aug. 7, 2015 from the European Patent Office issued in corresponding application No. 13743756.2.

* cited by examiner

INK FOR INK-JET PRINTING, PRINTED CYLINDRICAL CONTAINERS AND METHOD FOR PRODUCING THE SAME

CROSS REFERENCE TO RELATED APPLICATIONS

This application is a National Stage of International Application No. PCT/JP2013/052161 filed Jan. 31, 2013, claiming priority based on Japanese Patent Application No. 2012-021849 filed Feb. 3, 2012, the contents of all of which are incorporated herein by reference in their entirety.

TECHNICAL FIELD

This invention relates to an ink for ink-jet printing, to cylindrical containers printed by using the ink, and to a method of producing the same. More specifically, the invention relates to an ink for ink-jet printing that is excellent in sanitation and can be ejected in small dot sizes, to printed cylindrical containers on which fine images are printed in high resolution, and to a method of producing the printed cylindrical containers.

BACKGROUND ART

Seamless cans made from a metal such as aluminum or steel have large shock resistance and do not permit gases such as oxygen to pass through, offer such advantages as far superior preservability of the contents to the plastic containers as well as small weight as compared to glass bottles, and have been widely used as containers for containing carbonated beverages, alcohol beverages and many other beverages and foods.

Trade names and a variety of designs have been printed on the outer surfaces of the seamless cans by the plate-type printing using a printing plate, such as offset printing (patent document 1), or by the ink-jet printing without using the printing plate (patent document 2).

The ink-jet printing requires no plate offering such advantages that the design to be printed can be freely changed in short periods of time (variableness), that the ink can be thickly printed enabling images with deepness to be formed and that highly fine images such as photographs can be excellently reproduced.

On the other hand, printing images onto the outer surfaces of the seamless cans is of such a nature that the images are printed on the curved surfaces of cylinders made from a non-absorptive material that does not absorb the printing ink, the printing being effected while rotating the seamless cans. Therefore, if the printing ink of a low viscosity is used, the ink flows and spreads immediately after being printed forming blurred images and making it difficult to obtain sharply printed images. To ink-jet print the images onto the non-absorptive cylindrical containers such as seamless cans, therefore, it is a generally accepted practice to use an ultraviolet ray-curing ink that is capable of being cured or half-cured immediately after it is ejected and has impinged (patent document 3).

PRIOR ART DOCUMENTS

Patent Documents

Patent document 1: JP-A-2008-62455
Patent document 2: JP-A-2004-42464
Patent document 3: JP-A-2010-143200

OUTLINE OF THE INVENTION

Problems that the Invention is to Solve

However, the ultraviolet ray-curing ink for ink-jet printing contains a photopolymerization initiator which, from the standpoint of sanitation, is not desired to be used for the seamless cans that contain beverages and foods. Besides, the ultraviolet ray-curing ink for ink-jet printing is expensive, and undergoes the curing or half-curing immediately after it has impinged causing such problems as defective leveling, increased rough feeling on the printed images and poor luster.

Further, the ink-jet printing system is based on a principle of impinging ink droplets from ink-jet heads and is accompanied by such problems as poor reproduceability of density when the ink is solidly printed all over the surface, and limitation on the width of the heads, on the frequency of ejecting liquid droplets, on the area of printing and on the speed of printing.

It is, therefore, an object of the present invention to provide an ink for inkjet printing that can be favorably used for printing images onto non-absorptive cylindrical containers such as seamless cans used for containing beverages and foods yet maintaining excellent characteristics of the ink-jet printing.

Another object of the present invention is to provide printed cylindrical containers having vivid images as printed by the ink-jet printing, featuring excellent luster and close and excellent adhesiveness of the printed images even when the cans are subjected to the retort-sterilization.

A further object of the present invention is to provide a production method capable of continuously and efficiently producing printed cylindrical containers that have vivid images as printed by the ink-jet printing and luster.

A still further object of the present invention is to provide a production method capable of efficiently producing printed cylindrical containers that have vivid images as printed by the ink-jet printing and that are also solidly and excellently printed all over the surfaces thereof by the plate-type printing excellently reproducing the density.

Means for Solving the Problems

According to the present invention, there is provided an ink for ink-jet printing used for ink-jet printing images onto the ink non-absorptive surfaces of cylindrical containers, and comprising at least a water-soluble solvent, a coloring material, a surfactant, a thickener and/or a binder resin, the coloring material being contained in an amount of 5 to 20% by weight, the surfactant in an amount of 0.1 to 5% by weight, the thickener in an amount of not more than 10% by weight, and the binder resin being contained in an amount of not more than 30% by weight.

In the ink for ink-jet printing of the invention, it is desired that:
1. The binder resin comprises any one of an urethane resin, an epoxy resin, a polyester resin, a melamine resin or an acrylic resin, and is contained in an amount of 5 to 30% by weight;
2. The water-soluble solvent is at least one of a dialkyl glycol ether solvent, an ethylene glycol ether solvent or a propylene glycol ether solvent;
3. The water-soluble solvent has a boiling point of not lower than 120° C.;
4. The thickener is at least one of a cellulose ether soluble in alcohol or a polyvinyl acetal soluble in alcohol; and
5. The surfactant is a siloxane modified with polyether.

According to the present invention, further, there is provided a printed cylindrical container having an ink-jet printed layer formed on the ink non-absorptive surface of a cylindrical container by using the ink for ink-jet printing and, further, having a finishing varnish layer formed on the ink-jet-printed layer.

In the printed cylindrical container of the invention, it is desired that:
1. The finishing varnish layer comprises an aqueous finishing varnish using, as the base resin, any one of an acrylepoxy resin, acrylamino resin, polyester resin or polyesteramino resin; and
2. A white coating and/or an anchor coating is formed under the ink-jet-printed layer.

According to the invention, further, there is provided a method of producing a printed cylindrical container by adjusting the temperature on the ink non-absorptive surface of a cylindrical container to lie in a range of 25 to 100° C., effecting an ink-jet printing on the ink non-absorptive surface by using the ink for ink-jet printing, and applying a finishing varnish thereon.

In the method of producing a printed cylindrical container of the invention, it is desired that:
1. The image that is ink-jet-printed is false-baked before applying the finishing varnish and, thereafter, the finishing varnish that is applied is baked and cured;
2. The image is printed by the plate-type printing before or after the ink-jet printing; and
3. The ink-jet printing is effected through at least one ink-jet printing station in which a plurality of ink-jet heads are arranged.

Effects of the Invention

The ink for ink-jet printing of the present invention features excellent drying property and can effectively prevent blurring caused by the flow of the ink despite the non-absorptive cylindrical container is printed in a manner of being rotated. The ink dries more quickly upon adjusting the temperature of the non-absorptive surface of the cylindrical container making it possible to form vivid images having high resolution preventing the ink from blurring.

Besides, the viscosity of the ink is adjusted, a surfactant is added to adjust the leveling of the ink making it possible to control the dot diameter and, therefore, to form an image having excellent luster featuring excellent drying property of the ink and high resolution.

Further, owing to the use of a water-soluble solvent, the ink for ink-jet printing of the present invention has good affinity to the aqueous finishing varnish. Upon applying the finishing varnish from the upper side, therefore, the printed layer stays closely adhered to the base plate. Therefore, the printed images stay closely and excellent adhered assuring scratch resistance of the printed seamless cans even when the printed cylindrical containers (seamless cans) are subjected to such working as emboss working or necking or even to the retort-sterilization.

Moreover, the ink for ink-jet printing of the invention contains no photopolymerization initiator that is contained in the ultraviolet ray-curing inks and, therefore, excels in sanitation and can be used for contains for containing beverages and foods, too.

As described above, the printed cylindrical container of the invention has images formed thereon featuring high resolution and excellent luster without blurring of ink and, further, features close and excellent adhesion of the printed images as well as excellent scratch resistance owing to the application of the finishing varnish.

Further, the production method of the present invention is capable of continuously producing printed cylindrical containers forming images maintaining high resolution and excellent luster without causing the heads to be clogged, and is, further, capable of efficiently producing printed cylindrical containers having vivid images formed by the ink-jet printing combined with the image that is solidly printed by the plate-type printing excellently reproducing the density.

Figure 1:
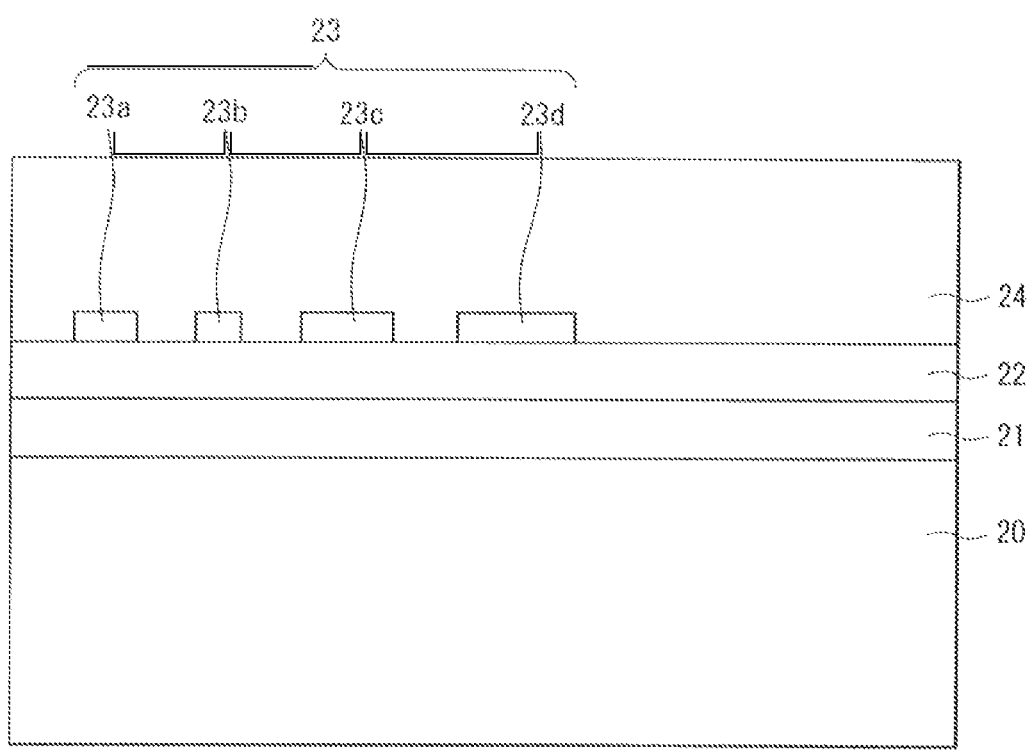
FIG. 1 is a view illustrating the structure in cross section of the body portion of a printed cylindrical container of the invention which comprises a seamless can.

MODES FOR CARRYING OUT THE INVENTION (Water-Soluble Solvents)

In the present invention, it is important to use a water-soluble solvent for the ink for ink-jet printing. As the water-soluble solvent, though not limited thereto only, there can be preferably used a dialkyl glycol ether solvent, an ethylene glycol ether solvent or a propylene glycol ether solvent.

As the dialkyl glycol ether solvent, there can be exemplified diethylene glycol dimethyl ether, triethylene glycol dimethyl ether, diethyene glycol methylethyl ether, diethylene glycol diethyl ether, diethylene glycol dibutyl ether and dipropylene glycol dimethyl ether.

As the ethylene glycol ether solvent, there can be exemplified ethylene glycol monomethyl ether, diethylene glycol monomethyl ether, triethylene glycol monomethyl ether, polyethylene glycol monomethyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, triethylene glycol monoisobutyl ether glycol and ethylene glycol acetate.

As the propylene glycol ether solvent, there can be exemplified propylene glycol monomethyl ether, dipropylene glycol ether, tripropylene glycol monoethyl ether, propylene glycol monopropyl ether, dipropylene glycol monopropyl ether, propylene glycol monobutyl ether and propylene glycol monomethyl ether acetate.

One or two or more kinds of these compounds can be used as the water-soluble solvent.

From the standpoint of preventing the heads from drying during the printing in the invention, it is desired that the water-soluble solvent that is used has a boiling point of not lower than 120° C. and, specifically, in a range of 120 to 300° C. If the boiling point is lower than the above range, the heads dry as compared to if it is in the above range, and the ejection performance of the ink may decrease. On the other hand, if the boiling point is higher than the above range, the ink may dry less than if it is in the above range.

If the cylindrical container on which the image is to be printed is put to the printing at room temperature without adjusting the temperature, it is desired that the water-soluble solvent that is used has a boiling point in a range of 120 to 230° C. from the standpoint of drying the ink.

According to the present invention, therefore, the water-soluble solvents that can be particularly favorably used for the seamless cans will be diethylene glycol diethyl ether, diethylene glycol monomethyl ether and dipropylene glycol monomethyl ether.

(Coloring Materials)

As the coloring material used for the ink for ink-jet printing of the invention, there can be used any known inorganic pigment, organic pigment and dye that have heretofore been used for the inks for ink-jet printing. From the standpoint of heat resistance and light resistance, however, it is desired to use the organic or inorganic pigment.

As the inorganic pigment, though not limited thereto only, there can be exemplified white pigments such as titanium oxide, zinc oxide and zinc sulfate; body pigments such as clay, talc, precipitated barium sulfate and calcium carbonate; chromatic pigments such as chrome yellow, chrome vermilion, cadmium pigment, nickel-titanium, chrome-titanium, yellow iron oxide, red iron oxide, zinc chromate, red lead, ultramarine, Prussian blue, cobalt blue, chrome green, chromium oxide and bismuth vanadate; black pigments such as carbon black, bone black and graphite; bright material pigments such as pearl pigment, aluminum pigment and bronze pigment; and fluorescent pigments such as zinc sulfate, strontium sulfate and strontium aluminate.

As the organic pigment, though not limited thereto only, there can be exemplified polycyclic pigments such as azo pigment, phthalocyanine pigment, quinacridone pigment, perillene pigment, perinone pigment, isoindolenone pigment, isoindoline pigment, dioxazine pigment, thioindigo pigment, anthraquinone pigment, quinophthalone and metal complex pigment; and dye lake pigments.

The coloring material is contained in the ink composition in an amount of, preferably, 5 to 20% by weight and, specifically, 8 to 15% by weight. If the amount of the coloring material is smaller than the above range, the density decreases during the printing, and shade may occur in the solidly printed portion. If the amount thereof is larger than the above range, on the other hand, the pigment may precipitate or the heads may be clogged.

(Surfactants)

It is important that the ink for ink-jet printing of the present invention is blended with a surfactant in order to control the surface tension of the ink composition and to adjust the leveling of the ink.

As the surfactant, there can be used the known ones such as anionic surfactant, cationic surfactant, amphoteric surfactant, and nonionic surfactant. Preferably, however, there are used silicone surfactant, acrylic surfactant and silicone-acrylic surfactant.

As the silicone surfactant, there can be exemplified polyether-modified siloxane, polyoxyalkylene-polydimethylsiloxane alternate block copolymer, siloxane modified with both polyether and alkyl, fluorinated dimethiconol, silicone modified with both perfluoroalkyl and polyoxyalkylene, silicone modified with both perfluoroalkyl and polyoxyalkylene, glyceryl-modified silicone, silicone modified with both perfluoroalkyl and polyglyceryl, and glycosyl-modified silicone.

As the acrylic surfactant, there can be preferably used a polymer obtained by using at least acrylic alkyl ester monomer. For example, there can be used a polymer comprising an acrylic alkyl ester monomer such as acrylic ethyl ester, acrylic normal propyl ester, acrylic isopropyl ester, acrylic normal butyl ester, acrylic isobutyl ester, acrylic tertiary butyl ester, acrylic normal octyl ester, acrylic 2-ethylhexyl ester or acrylic isononyl ester, or a copolymer or terpolymer comprising two or more kinds of other monomers having ethylenic double bond.

A polyether-modified siloxane surfactant such as methylpolysiloxane can be, specifically preferably, used for the ink for ink-jet printing of the present invention.

The surfactant is contained in the ink composition in an amount of, preferably, 0.1 to 5% by weight and, specifically, 0.3 to 3% by weight. If the amount of the surfactant is smaller than the above range, the surface tension of the ink cannot be controlled and the ink may be poorly ejected from the heads. If the amount of the surfactant is larger than the above range, on the other hand, the ink concentration increases, the drying rate of ink decreases, and the initial adhering force to the base material may decrease.

(Thickeners and Binder Resins)

The ink for ink-jet printing of the invention desirably contains a thickener for controlling the viscosity of the ink.

The thickener used for the invention will be polyvinyl acetal polymer, cellulose polymer, polyvinyl alcohol polymer, polyether polymer, polysaccharide polymer, polyacrylic polymer or pyrrolidone polymer. Specifically desirably, there is used a high molecular thickener comprising a polyvinyl acetal polymer soluble in alcohol or a cellulose ether polymer soluble in alcohol.

Concretely, there can be used synthetic polymers such as polyvinyl butyral, polyvinyl alcohol, various kinds of modified polyvinyl alcohols, polyvinyl pyrrolidone, vinyl formal and derivatives thereof, methyl cellulose, ethyl cellulose, carboxymethyl cellulose, hydroxypropyl cellulose, polyoxyalkylene glycols, polymer containing an acrylic group of polyacrylamide, polydimethylacrylamide, polydimethylaminoacrylate, sodium polyacrylate, acrylic acid-methacrylic acid copolymer salt, sodium polymethacrylate, acrylic acid-vinyl alcohol copolymer salt, starch, oxidized starch powder, carboxyl starch, dialdehyde starch, dextrin, sodium alginate, gum arabi, casein, pullulan, dextran, polyethylene glycol, polypropylene glycol, polyvinyl ether, polyglycerin, maleic acid-alkyl vinyl ether copolymer, maleic acid-N-vinylpyrrole copolymer, styrene-maleic anhydride copolymer and polyethyleneimine in a combination of two or more kinds.

In the present invention, it is specifically desired to use an ethyl cellulose or polyvinyl butylal that is solid at normal temperature and is soluble in alcohol from the standpoint of solubility in a solvent and drying property after printed.

The thickener is determined for its content depending on its kind and a desired viscosity of the ink, and is, preferably, contained in the ink composition in an amount of not more than 10% by weight and, specifically, in a range of 0.3 to 3% by weight. If no thickener is contained, the ink has a low viscosity and may tend to spread when it has impinged as compared to if the thickener is contained within the above range. If the amount of the thickener is larger than the above range, on the other hand, the viscosity of the ink so increases that the ink may be poorly ejected and the drying rate of the ink may decrease.

The ink for ink-jet printing of the invention, desirably, contains a binder resin from the standpoint of improving initial adhesiveness of the printed image to the base member and improving luster on the printed surface. From the standpoint of adjusting the viscosity of the ink, the binder resin acts like the above-mentioned thickener. Therefore, either the thickener or the binder resin may be contained. It is, however, desired that both of them are contained.

As the binder resin, there can be used those that have heretofore been used as binder resins for the inks of the solvent type. Preferably, there are used resins that can be cured by drying, such as urethane resin, epoxy resin, polyester resin, melamine resin and acrylic resin.

The binder resin is contained in the ink composition, preferably in an amount of not more than 30% by weight and, specifically, in a range of 5 to 30% by weight. If no binder resin is contained, the printed image adheres poorly as compared to if the binder resin is contained in the above range and, besides, the ink easily dries and clogs in the heads and is poorly ejected. If the amount of the binder resin is larger than the above range, on the other hand, the viscosity of the ink so increases that the drying rate of the ink may decrease.

(Ink Compositions)

The ink for ink-jet printing of the present invention is an ink composition comprising a water-soluble solvent, a coloring material, a surfactant, a thickener and/or a binder resin and, as described above, contains the coloring material in an amount of 5 to 20% by weight, the surfactant in an amount of 0.1 to 5% by weight, the thickener in an amount of not more than 10% by weight, and the binder resin in an amount of not more than 30% by weight, the remainder being a water-soluble solvent.

The ink for ink-jet printing of the invention has a surface tension in a range of, preferably, 25 to 30 mN/m though not limited thereto only, enabling dot diameter to become small and preventing the ink from spreading and blurring.

It is, further, desired that the viscosity of the ink is in a range of 8 to 15 mPa·s though it may vary depending on the kind of the heads and the drying conditions that will be described later and cannot be exclusively determined.

The ink for ink-jet printing of the invention can be prepared according to a known method so far as it has the above-mentioned composition. For instance, though not limited thereto only, the components except the binder resin are mixed together, dispersed by using a dispersing device and, thereafter, a solution dissolving the binder resin therein is added thereto, followed by stirring to prepare an ink composition. Or the coloring material and the binder resin are kneaded together in advance, and other components are added thereto, and an aqueous dispersion is prepared by using a stirring/dispersing device.

(Printed Cylindrical Containers)

As described above, the ink for ink-jet printing of the invention dries excellently. Therefore, the image can be printed on the non-absorptive cylindrical container while rotating it effectively preventing blurring caused by the flow of the ink. Namely, the image can be formed maintaining high resolution and luster even on the cylindrical containers having non-absorptive surfaces.

From the above point of view, it is desired that the containers to be printed by the invention are the cylindrical containers having outer surfaces that do not absorb ink, and having a layer printed by using the above ink for ink-jet printing and a finishing varnish layer covering at least the whole surface of the printed layer.

As the cylindrical containers having non-absorptive surfaces according to the present invention, there can be exemplified cylindrical metal cans such as seamless cans and welded cans, as well as known ones such as tubes used for the tubular containers. The present invention, however, can be specifically preferably applied to the seamless cans.

As the cylindrical containers to be printed by the present invention, though not limited thereto only, there can be used seamless cans produced by subjecting various kinds of surface-treated steel plates such as tin-free steel (TFS) or various kinds of plated steel plates such as those plated with tin, light metal plates such as of aluminum, or resin-coated metal plates obtained by coating such metal plates with a thermoplastic resin such as polyester resin, to the widely known means such as draw•redraw working, bend-stretch working (stretching) based on draw•redrawing, bend-stretch•ironing working based on draw•redrawing or draw-ironing working, or impact working of light metal plates.

Further, the tubular containers may comprise a thermoplastic resin such as polyethylene or polypropylene, or a laminate of a thermoplastic resin and a metal foil having a port formed at one end of the tube and the other end thereof being melt-adhered. The printing is effected while the container is in a cylindrical form of before melt-adhering the end thereof.

It is, further, desired to form a white coating on the outer surface of the seamless can as it conceals the ground color of the metal and plate enables the image to be vividly printed.

It is, further, desired to form an anchor coating on the above white coating or on the outer surface of the seamless can if there has been formed no white coating. The anchor coating firmly holds and fixes the images that are ink-jet printed and, further, improves close adhesion of the printed images. The anchor coating, further, reduces the blurring of the ink for ink-jet-printing.

The anchor coating can be formed by a known method. Namely, a heat-curable, ultraviolet ray-curable or electron ray-curable transparent polyester resin, acrylic resin, epoxy resin or urethane resin is dispersed or dissolved in a predetermined solvent to prepare a coating solution which is then applied, dried, and is cured by heating, by the irradiation with ultraviolet rays or electron rays to form the anchor coating. Among them, preferred is a method of heat-curing the heat-curable resin from the standpoint of a wide range of selection of the resins.

The white coating can also be formed in the same manner by containing a white pigment such as titanium dioxide in a coating solution of a resin that was exemplified above as the resin used for forming the anchor coating. Here, a preferred method comprises heat-curing a coating solution that is obtained by dispersing or dissolving a heat-curable resin in a solvent.

From the standpoint of concealing the ground color, the white coating has a thickness in a range of 0.1 to 10 μm and, specifically, 0.5 to 5 μm, and the anchor coating has a thickness in a range of 0.1 to 5 μm and, specifically, 0.1 to 2 μm.

The same effect can be obtained even by forming a white resin coating that contains a white pigment in the resin coating of a resin-coated metal plate instead of forming the white coating.

As the finishing varnish to be applied onto the printed cylindrical container of the invention, there can be used a transparent coating material that has heretofore been used as the top coating of the printed containers. The ink for ink-jet printing of the invention, however, uses a water-soluble solvent. It is, therefore, specifically desired to use an aqueous finishing varnish from the standpoint of close adhesion to the printed images.

As such a finishing varnish, there can be preferably used an aqueous finishing varnish that uses acrylepoxy resin, acrylamino resin, polyester resin or polyester amino resin as the base resin.

It is important that the finishing varnish completely covers at least the printed layer and is, desirably, applied onto the whole surface.

It is, further, desired that the finishing varnish layer has a thickness in a range of 1 to 5 µm though not limited thereto only.

As described above, it is desired that the finishing varnish, too, is an aqueous finishing varnish containing no photopolymerization initiator like the ink for ink-jet printing from the standpoint of close adhesion to the ink for ink-jet printing and sanitation. However, if the printed cylindrical container is not for containing beverages or foods or if it is the tubular container that is not of a nature to come into direct contact with the human mouth, then the finishing varnish of the ultraviolet ray-curing type may be applied onto the images that are ink-jet printed by using the ink of the present invention.

The printed cylindrical containers of the present invention are such that the above various kinds of cylindrical containers have images ink-jet printed on their outer surfaces or that the seamless cans have images ink-jet printed on at least their body portions in addition to having, as required, images formed by the plate-type printing that will be described later, the images being covered with the finishing varnish layer.

FIG. 1 is a view illustrating the structure in cross section of the body portion of a printed cylindrical container of the invention which comprises a seamless can, wherein a white coating 21 is formed on the outer surface of a can body 20, and an anchor coating 22 is formed on the white coating 21. On the anchor coating 22, there are formed layers 23a, 23b, 23c, 23d due to the impingement of inks or ink-jet printing. A finishing varnish layer 24 is formed covering the whole surfaces inclusive of the ink-jet printed layers 23a, 23b, 23c, 23d formed by the ink-jet printing.

(Method of Producing Printed Cylindrical Containers)

According to the present invention, images are printed on the cylindrical containers relying on an ink-jet printing system that has heretofore been used for printing images on the cylindrical containers having non-absorptive surfaces with the exception of using the ink of the present invention for ink-jet printing, applying the finishing varnish after the ink-jet printing has been finished, and adjusting the non-absorptive surfaces of the cylindrical containers at a temperature of 25 to 100° C. and, specifically, 40 to 80° C.

Namely, the ink of the present invention for ink-jet printing has excellent drying property. Upon adjusting the temperature on the surface of the container, in particular, drying property of the ink is further improved, the ink is prevented from blurring, and images of high resolution can be formed. By forming the finishing varnish layer on the printed layer as described above, further, the printed layer is protected and scratch resistance can be improved.

The temperature on the non-absorptive surface of the cylindrical container can be adjusted by a known temperature-adjusting method. Not being limited thereto, however, the mandrel supporting and fixing the cylindrical container may be blown with hot water or hot air, or may be heated by high frequency heating or infrared-ray heating in order to indirectly heat the non-absorptive surface of the cylindrical container to adjust the temperature. Or the non-absorptive surface itself of the cylindrical container may be directly heated by high frequency heating or infrared-ray heating to adjust the temperature.

Figure 2:
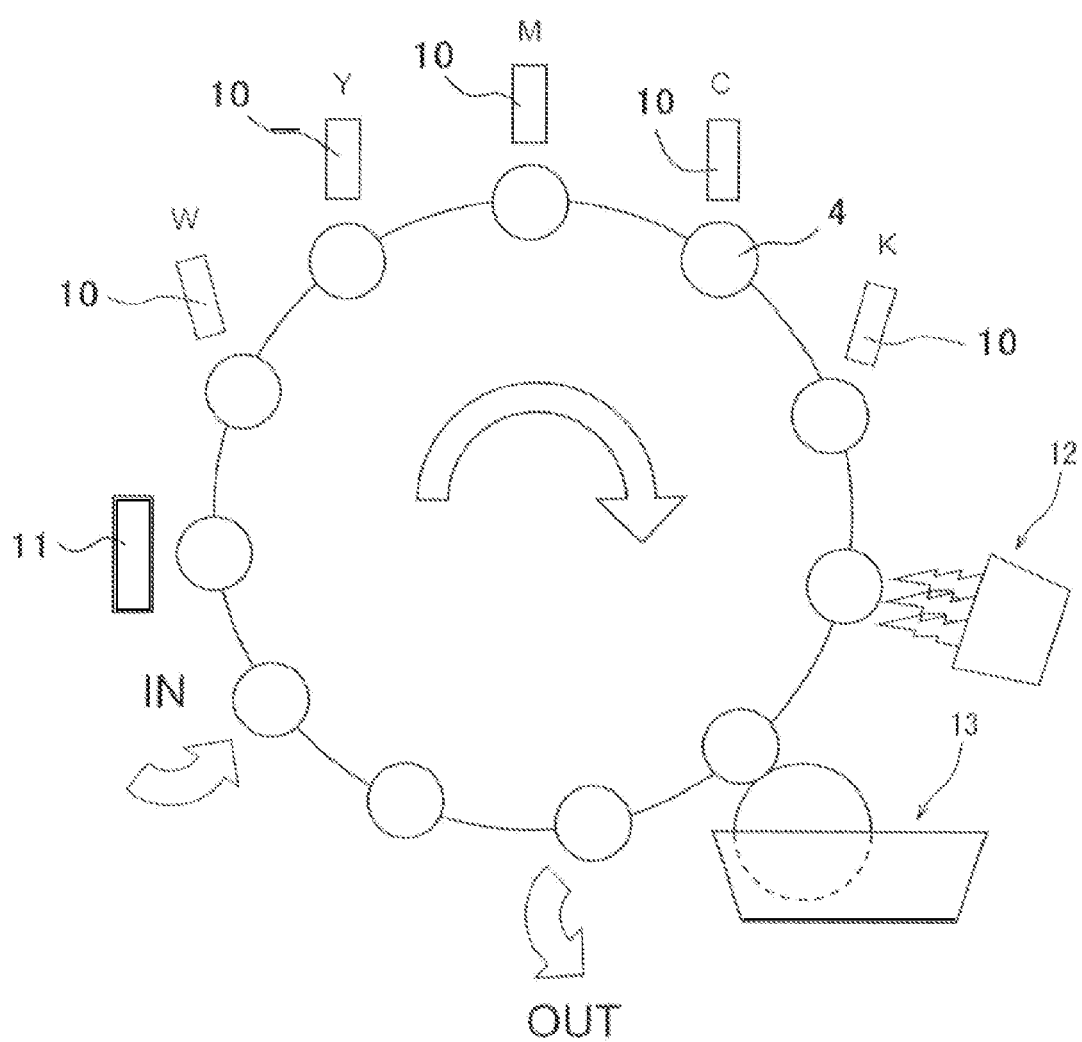
FIG. 2 is a view schematically illustrating an ink-jet printing apparatus used for producing the printed cylindrical containers of the present invention.

In an ink-jet printing apparatus shown, for example, in FIG. 2, a plurality of mandrels 4 are disposed on a mandrel wheel maintaining an equal distance, the mandrel wheel intermittently revolving clockwise and the mandrels 4 rotating clockwise on their axes in each station. Droplets of inks are ejected from ink-jet heads 10 corresponding to the inks of white (W), yellow (Y), magenta (M), cyan (C) and black (K), and images are printed on the seamless can that is fitted to the mandrel 4. In the ink-jet printing apparatus shown in FIG. 2, the positioning for printing is accomplished at a station 11 preceding the ink-jet head 10 that corresponds to the white (W) ink. After all of the inks have been applied, a false-baking is effected at a station 12, and the finishing varnish is applied at a station 13. Arrangement of the ink-jet heads of the colors is not limited to the example that is shown but they may be arranged in any order.

It is desired that the ink-jet printed images are false-cured by false-baking prior to being mainly cured that is executed simultaneously with the heat-curing of the finishing varnish. This makes it possible to form sharp images without permitting the inks to spread or blur. The timing of the false-baking may vary depending on the desired images or the kind of the ink used for the ink-jet printing, and may be (i) after the inks of all colors have been fed, (ii) right after each ink is fed, (iii) after an ink is fed but before the next ink is fed, or (iv) twice right after the white ink is fed and after all colors have been fed. From the economical point of view, however, it is desired that the false-baking is effected at the above timing (i).

Further, if a seamless can without white coating is used as the cylindrical container as described above, then the white ink may have been solidly ink-jet printed all over the surface thereof so that the ink-jet printed image may appear vividly. In this case, the white ink that is fed first is false-baked and, next, the inks of other colors are applied onto the white ink followed by false-baking again prior to applying the finishing varnish, the false-baking being effected at the above-mentioned timing (iv). In the concrete example shown in FIG. 2, further, the step of positioning is executed prior to the ink-jet printing, which, however, maybe omitted depending on the printed images.

Further, the printed cylindrical container of the invention may be printed with the images not only by the plate-type printing but also by the ink-jet printing. This makes it possible to form variable images based on the ink-jet printing in addition to forming images based on the plate-type solid printing image that excellently reproduces the density, i.e., makes it possible to excellently reproduce the image density that could not be attained by the ink-jet printing alone.

The plate-type printing can be carried out by using the printing system based on the relief printing or the lithography that has heretofore been employed for printing seamless cans and, specifically desirably, by using the offset printing.

There is no specific order in conducting the ink-jet printing and the plate-type printing, and the order may be suitably determined depending on the design. The plate-type printing and the ink-jet printing may be executed by using independent printing apparatuses, or may be executed by using the same apparatus, i.e., by using a hybrid apparatus.

Figure 3:
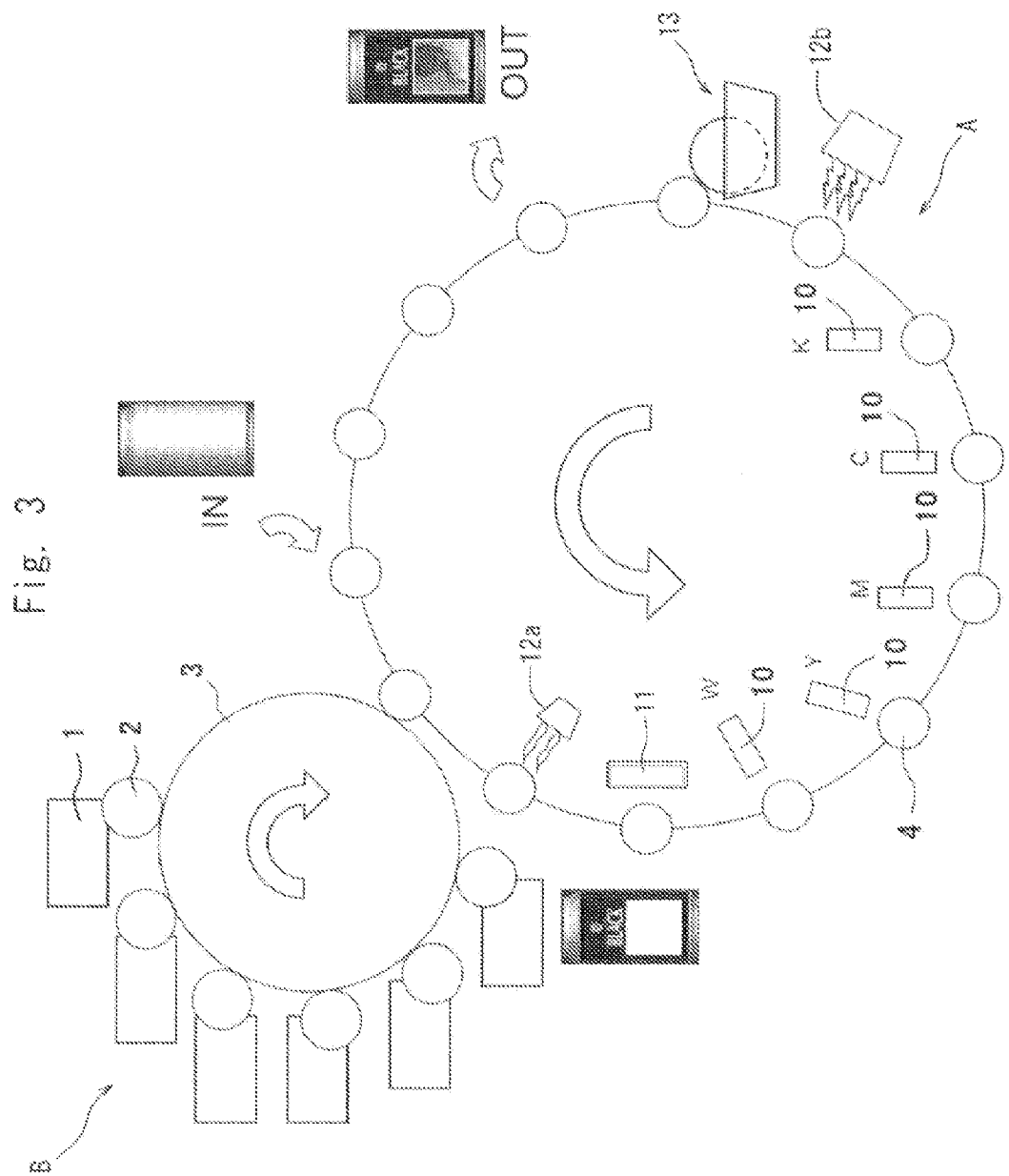
FIG. 3 is a view illustrating a printing system used for producing the printed cylindrical containers of the invention by executing the plate-type printing and the ink-jet printing in the same apparatus.

FIG. 3 is a view of a hybrid apparatus that executes the plate-type printing (B) prior to the ink-jet printing (A), wherein the printing inks are fed from the ink-feed unit 1 to the printing plates (not shown) such as relief printing plates on the plate cylinders 2, and the inks on the dots and images of the printing plates are transferred onto a blanket 3. The inks of various colors transferred onto the blanket 3 are transferred onto the cylindrical containers (seamless cans) fitted onto the mandrels 4 to obtain the cylindrical containers (seamless cans) having images formed by the plate-type printing. Next, the cylindrical containers (seamless cans) having images formed by the print-type printing are false-baked at the next station 12a, and the images are positioned at the station 11. Thereafter, droplets of the inks are successively ejected from the ink-jet heads 10 corresponding to the inks of white (W), yellow (Y), magenta (M), cyan (C) and black (K) to ink-jet print the images on the cylindrical containers (seamless cans) fitted to the mandrels 4. At the next station 12b, the false-baking is effected and at the station 13, the finishing varnish is applied and cured to thereby obtain the printed cylindrical containers.

If the plate-type printing is to be effected prior to the ink-jet printing, it is desired that the inks are false-cured by false-baking before effecting the ink-jet printing. This prevents blurring on the portions where the ink-jet printing overlaps the images.

Figure 4:
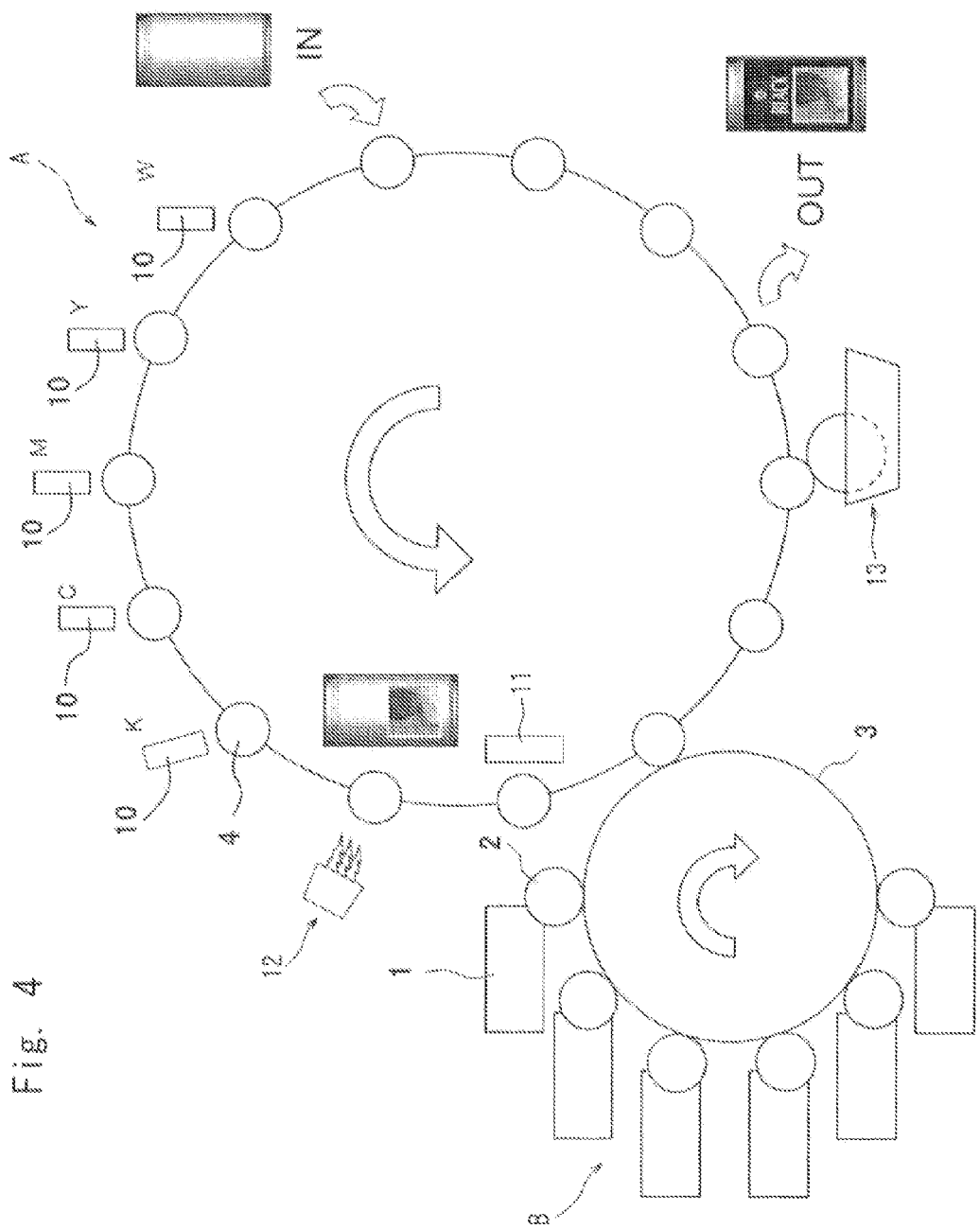
FIG. 4 is a view illustrating another printing system used for producing the printed cylindrical containers of the invention by executing the plate-type printing and the ink-jet printing in the same apparatus.

FIG. 4 is a view of a hybrid apparatus that executes the ink-jet printing (A) prior to the plate-type printing (B). In this case, too, it is desired that the false-baking is effected at the station 12 after the ink-jet printing (A) has been effected but before effecting the plate-type printing (B).

According to the present invention, the cylindrical containers can be inkjet printed by using an ink-jet printing apparatus that has at least one ink-jet printing station in which a plurality of ink-jet heads are arranged.

Figure 5:
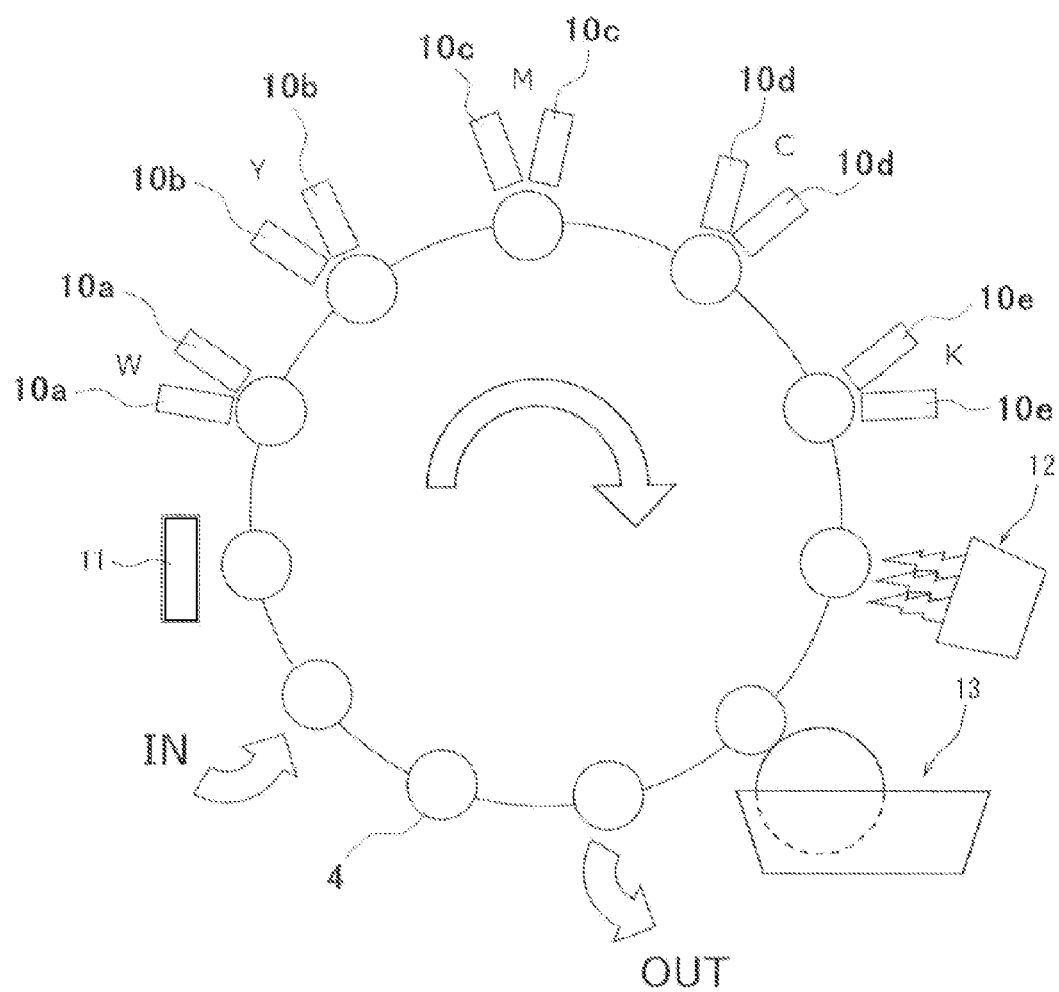
FIG. 5 is a view illustrating a further ink-jet printing apparatus used for producing the printed cylindrical containers of the present invention.

That is, referring to FIG. 5, the ink-jet heads 10a to 10e are provided each in a number of two in the respective printing stations corresponding to the inks of white (W), yellow (Y), magenta (M), cyan (C) and black (K), featuring faster printing speed than in the printing stations each having one ink-jet head, higher dot density and improved resolution, increased thickness of inks due to overlapped application of the inks maintaining precise dots, and offering printed images which are high dense.

The arrangement of the printing stations of the above colors on the mandrel wheel is not limited to the example shown in FIG. 5 only, but maybe of any order. In the concrete example shown in FIG. 5, further, the step of positioning is conducted prior to the ink-jet printing, which, however, may be omitted depending on the printed images.

The ink-jet printing stations are not limited to those shown in FIG. 5 but may assume the form in which as shown in FIG. 6(a) to (c), two, three or four ink-jet heads 10 are arranged on the outer side of the mandrel wheel (in the drawings, dotted lines represent the track thereof). Or as shown in FIG. 6(d) and (e), one or two ink-jet heads may be arranged on the outer side and on the inner side of the mandrel wheel with the seamless can 5 fitted on the mandrel 4 interposed therebetween.

Figure 6:
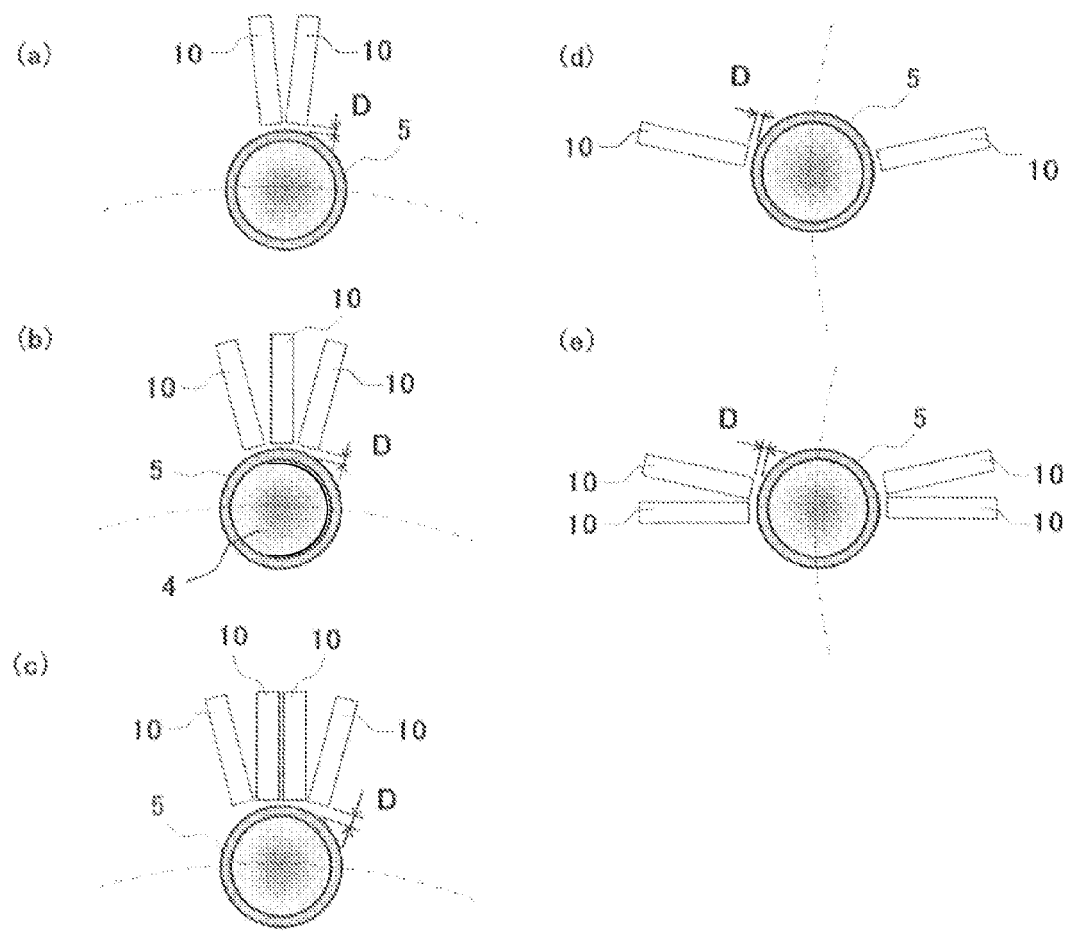
FIG. 6 is a view illustrating the arrangement of ink-jet heads in the ink-jet printing apparatus used for producing the printed cylindrical containers of the present invention.

Though FIG. 6 does not clearly show the positional relationship of the ink-jet heads in the direction of height of the seamless can, the ink-jet heads can be moved in the direction of height of the seamless can. Namely, the positions of the plurality of ink-jet heads can be varied depending on the images to be printed, such as being varied in the direction of height of the seamless can in addition to being arranged at the same positions in the circumferential direction of the seamless can.

In the ink-jet printing as described above, further, the ink droplets are injected so as to impinge on the surface of the seamless can. From the standpoint of preventing the generation of ink mist, therefore, it is desired that the distance is small over which the ink flies through the space from the ejection portions at the end of the ink-jet heads to the can on where they adhere. Preferably, the distance D is in a range of 0.5 to 4.0 mm from the ejection portions at the end of the ink-jet heads to the surface of the seamless can.

EXAMPLES

Examples 1 to 20, 23 to 24, Comparative Examples 1 to 10, Experimental Examples 1 to 10

A draw-worked cup was produced by blanking an alloy plate of aluminum JIS 3004 of a thickness of 0.30 mm according to a customary manner. The draw-worked cup was subjected to the redraw-ironing working, the mouth portion thereof was trimmed, the inner and outer surfaces thereof were washed with an acid solution by using a washer and were, further, washed with industrial water and with deionized water, followed by drying, to obtain a cylindrical cup (hereinafter often called "DI can") for producing a 350-ml seamless can having a can body nominal diameter of 211.

By using the ink-jet printing apparatus shown in FIG. 2, the cylindrical cup was inserted in a mandrel and was secured therein by vacuum from the interior of the mandrel. The mandrel wheel of the apparatus shown in FIG. 2 was intermittently rotated, and when the mandrel wheel was stopped rotating, the mandrel was rotated once on its axis to effect the ink-jet dot printing with the ink for ink-jet printing followed by false-baking with the hot air of 100° C., application with an aqueous finishing varnish and baking (main curing) in an oven heated at 200° C. for one minute to produce a printed seamless can. The temperature of the non-absorptive surface (surface of body of the cylindrical cup) during the printing was adjusted to a setpoint value by blowing the hot air to the mandrel. The compositions of the inks for ink-jet printing were as shown in Tables 1 and 2. The concentrations of ink components in Tables 1 and 2 were all percent by weight in the ink compositions.

The ink-jet head used for the ink-jet printing (hereinafter often called "IJP") was of the one-head type of piezo system and was capable of effecting the printing on the side wall of the cylindrical cup over a width of about 70 mm in the direction of height of the can. There was printed an ink-jet dot image over the whole circumference of the can body maintaining a width of about 70 mm in the direction of height of the can, and the resolution of the dot-printing was 360 dpi (the distance between the centers of the dots was about 70.6 μm) in either the direction of height of the can and the circumferential direction of the can. Tables 1 and 2 show the specifications of the inks that were used, specifications of the cans and the results of evaluation.

(Method of Evaluation)
<Continuity of Production (If the Ink-Jet Head was Clogged)>

This was to evaluate if the "ink-jet head was clogged". After having continued the ink-jet printing on the DI can bodies by using the above head for 10 minutes, the can was false-baked to visually evaluate the degree of "dimming" of image. Here, the "dimming" is a phenomenon in which if nozzles of the head are clogged, dots become missing at such positions and stripes develop during the printing in the direction in which the base material is sent.

The evaluation was based on that no dot was missing (⊚), dots were partly missing but were not continuously missing (◯), dots were continuously missing and stripes were developing discretely (Δ), and dots were continuously missing and a plurality of stripes were developing continuously (X). Marks ⊚, ◯ and Δ represent allowable ranges.

<Blurring>

This was to evaluate if the ink-jet printed image was "blurred due to the linking of dots". The can body after the finishing varnish was baked in the oven was evaluated by using a stereoscopic microscope. The evaluation was divided into four steps. Here, the "blurring" is a phenomenon in which dots that have impinged spread and link themselves to the neighboring dots.

The evaluation was based on that the neighboring dots were not linked together but remain completely independent (⊚), the neighboring dots were linked together in a manner of nearly contacting to each other (◯), the neighboring dots were linked together and dot shapes were partly changing (Δ), and the neighboring dots were almost all linked together, dot shapes were changing, and some dots could not be confirmed (X). Marks ⊚, ◯ and Δ represent allowable ranges.

<Vividness>

This was the "evaluation concerned to the dot color tone" of the ink-jet printed image. The can body after the finishing varnish was baked in the oven was evaluated by using the stereoscopic microscope. The evaluation was divided into four steps.

The evaluation was based on that the dots by themselves had a high density and exhibited pitch-black appearance on the whole surface (⊚), the dots by themselves had a high density but the density was locally low on the surface (◯), the dots by themselves did not have so high density, and the density was generally low on the whole surface (Δ), and the dots by themselves had a low density over the whole surface and were affected by the underlying layer (X). Marks ⊚, ◯ and Δ represent allowable ranges.

<Close Adhesion (Without Finishing Varnish)>

This was to evaluate the "close adhesion of the dots to the under-layer". By using a cutter knife, six scratches were engraved in the dot-printed portion (without finishing varnish) of the can body after it was false-baked maintaining a distance of 1 mm either in the direction of height of the can or in the circumferential direction of the can to form a grid pattern of 25 pieces. A cellophane tape (registered trademark, manufactured by Nichiban Co.) was stuck thereto and was removed once to evaluate the close adhesion of the ink on the following basis. The evaluation was based on that there was no peeling (⊚), peeling was less than 10% (◯), peeling was not less than 10% but was less than 30% (Δ), and peeling was not less than 30% (X). Marks ⊚, ◯ and Δ represent allowable ranges.

<Close Adhesion (After Retort-Treatment)>

This was to evaluate the "close adhesion of the dots to the under-layer after the retort-treatment". The finishing varnish was applied onto the printed can body, baked in the oven, subjected to the retort-treatment at 120° C. for 30 minutes, and was cooled. By using the cutter knife, six scratches were engraved in the dot-printed portion of the can body maintaining a distance of 1 mm either in the direction of height of the can or in the circumferential direction of the can to form a grid pattern of 25 pieces. A cellophane tape (registered trademark, manufactured by Nichiban Co.) was stuck thereto and was removed once to evaluate the close adhesion of the ink on the following basis. The evaluation was based on that there was no peeling (⊚), peeling was less than 10% (◯), peeling was not less than 10% but was less than 30% (Δ), and peeling was not less than 30% (X). Marks ⊚, ◯ and Δ represent allowable ranges.

<Overall Evaluation>

The overall evaluation was based on the least evaluated points in the evaluations of the continuity of production (if ink-jet head was clogged), blurring, vividness, close adhesion (without finishing varnish) and close adhesion (after the retort-treatment). Marks ⊚, ◯ and Δ represent allowable ranges.

Example 21

A printed seamless can was prepared and evaluated in the same manner as in Example 1 but applying a heat-curable base coating (white coating) containing a titanium dioxide pigment onto the outer surface of a cylindrical cup followed by baking and, thereafter, ink-jet-dot printing an image thereon.

Example 22

A printed seamless can was prepared and evaluated in the same manner as in Example 1 but applying an epoxy resin-type anchor coating onto the outer surface of the cylindrical cup followed by baking and, thereafter, ink-jet-dot printing an image thereon.

Example 25

A draw-worked cup was produced by heat-laminating an isophthalic acid-copolymerized polyethylene terephthalate (PET) film of a thickness of 15 μm on both surfaces of an alloy sheet of aluminum JIS 3004 of a thickness of 0.28 mm according to a customary manner, followed by blanking. The draw-worked cup was subjected to the redraw-ironing working, the mouth portion thereof was trimmed, and the thermal distortion of the film was removed by heating to obtain a 350-ml seamless can having a can body nominal diameter of 211.

Example 26

A low-density polyethylene resin (LDPE) was heat-melted and was formed into a parison by using an injection-forming machine, and from which a cylindrical tube of a diameter of 32 mm and a height of 150 mm was prepared by the blow-forming method forming a thread on the mouth portion thereof for fitting a cap. Thereafter, the cylindrical tube was inserted in the mandrel of the ink-jet printing apparatus shown in FIG. 2 and was secured therein by vacuum from the interior of the mandrel. The mandrel wheel of the apparatus shown in FIG. 2 was intermittently rotated, and when the mandrel wheel was stopped rotating, the mandrel was rotated once on its axis to effect the ink-jet dot printing with the ink for ink-jet printing followed by baking with the hot air of 80° C., application with an ultraviolet-ray-curing finishing varnish and curing by the irradiation with ultraviolet rays to produce a printed tube. The temperature of the non-absorptive surface (temperature on the surface of the tube) during the printing was adjusted to a setpoint value by blowing the hot air to the mandrel. The evaluation was made in the same manner as in Example 1 without, however, evaluating the close adhesion (after the retort-treatment).

TABLE 1

| Ex. | *1 | B.P. (° C.) | *2 (%) | Binder (%) | *3 (%) | *4 (%) | Finish varnish | Layer on which IJP is effected | Can temp. (° C.) |
|---|---|---|---|---|---|---|---|---|---|
| 1 | A | 189 | 10 | urethane type (10) | K(1) | 1 | P | aluminum | 25 |
| 2 | B | 194 | 10 | urethane type (10) | K(1) | 1 | P | aluminum | 25 |
| 3 | C | 187 | 10 | urethane type (10) | K(1) | 1 | P | aluminum | 25 |
| 4 | A | 189 | 5 | urethane type (10) | K(1) | 1 | P | aluminum | 25 |
| 5 | A | 189 | 20 | urethane type (10) | K(1) | 1 | P | aluminum | 25 |
| 6 | A | 189 | 10 | none | K(1) | 1 | P | aluminum | 25 |
| 7 | A | 189 | 10 | urethane type (5) | K(1) | 1 | P | aluminum | 25 |
| 8 | A | 189 | 10 | urethane type (30) | K(1) | 1 | P | aluminum | 25 |
| 9 | A | 189 | 10 | epoxy type (10) | K(1) | 1 | P | aluminum | 25 |
| 10 | A | 189 | 10 | polyester type (10) | K(1) | 1 | P | aluminum | 25 |
| 11 | A | 189 | 10 | melanin type (10) | K(1) | 1 | P | aluminum | 25 |
| 12 | A | 189 | 10 | acrylic type (10) | K(1) | 1 | P | aluminum | 25 |
| 13 | A | 189 | 10 | urethane type (10) | none | 1 | P | aluminum | 25 |
| 14 | A | 189 | 10 | urethane type (10) | K(10) | 1 | P | aluminum | 25 |
| 15 | A | 189 | 10 | urethane type (10) | L(1) | 1 | P | aluminum | 25 |
| 16 | A | 189 | 10 | urethane type (10) | K(1) | 0.1 | P | aluminum | 25 |
| 17 | A | 189 | 10 | urethane type (10) | K(1) | 5 | P | aluminum | 25 |
| 18 | A | 189 | 10 | urethane type (10) | K(1) | 1 | Q | aluminum | 25 |
| 19 | A | 189 | 10 | urethane type (10) | K(1) | 1 | R | aluminum | 25 |
| 20 | A | 189 | 10 | urethane type (10) | K(1) | 1 | S | aluminum | 25 |
| 21 | A | 189 | 10 | urethane type (10) | K(1) | 1 | P | white coat | 25 |
| 22 | A | 189 | 10 | urethane type (10) | K(1) | 1 | P | anchor coat | 25 |
| 23 | D | 121 | 10 | urethane type (10) | K(1) | 1 | P | aluminum | 25 |
| 24 | E | 230 | 10 | urethane type (10) | K(1) | 1 | P | aluminum | 25 |
| 25 | A | 189 | 10 | urethane type (10) | K(1) | 1 | P | PET | 25 |
| 26 | A | 189 | 10 | urethane type (10) | K(1) | 1 | T | LDPE | 25 |

| Ex. | Production continuity | Blurring | Vividness | Adhesion (without varnish) | Adhesion (after retort) | Overall evaluation |
|---|---|---|---|---|---|---|
| 1 | ⊙ | ○ | ○ | ⊙ | ⊙ | ○ |
| 2 | ⊙ | ○ | ○ | ⊙ | ⊙ | ○ |
| 3 | ⊙ | ○ | ○ | ⊙ | ⊙ | ○ |
| 4 | ⊙ | ○ | Δ | ⊙ | ⊙ | Δ |
| 5 | Δ | ○ | ⊙ | ⊙ | ⊙ | Δ |
| 6 | Δ | ○ | ○ | Δ | Δ | Δ |
| 7 | ⊙ | ○ | ○ | ○ | ⊙ | ○ |
| 8 | ⊙ | Δ | Δ | ○ | ⊙ | Δ |
| 9 | ⊙ | ○ | ○ | ⊙ | ⊙ | ○ |
| 10 | ⊙ | ○ | ○ | ⊙ | ⊙ | ○ |
| 11 | ⊙ | ○ | ○ | ⊙ | ⊙ | ○ |
| 12 | ⊙ | ○ | ○ | ⊙ | ⊙ | ○ |
| 13 | ⊙ | Δ | Δ | ○ | ⊙ | Δ |
| 14 | Δ | ○ | ○ | ⊙ | ⊙ | Δ |
| 15 | ⊙ | ○ | ○ | ⊙ | ⊙ | ○ |
| 16 | ⊙ | Δ | Δ | ⊙ | ⊙ | Δ |
| 17 | ⊙ | ○ | Δ | ⊙ | ⊙ | Δ |
| 18 | ⊙ | ○ | ○ | ⊙ | ⊙ | ○ |
| 19 | ⊙ | ○ | ○ | ⊙ | ⊙ | ○ |
| 20 | ⊙ | ○ | ○ | ⊙ | ⊙ | ○ |
| 21 | ⊙ | ○ | ○ | ⊙ | ⊙ | ○ |
| 22 | ⊙ | ○ | ○ | ⊙ | ⊙ | ○ |
| 23 | Δ | ○ | ○ | ⊙ | ⊙ | Δ |
| 24 | ⊙ | Δ | Δ | Δ | ○ | Δ |
| 25 | ⊙ | ○ | ○ | ⊙ | ⊙ | ○ |
| 26 | ⊙ | ○ | ○ | ⊙ | none | ○ |

| Comp. Ex. | *1 | B.P. (° C.) | *2 (%) | Binder (%) | *3 (%) | *4 (%) | Finish varnish | Layer on which IJP is effected | Can temp. (° C.) |
|---|---|---|---|---|---|---|---|---|---|
| 1 | F | 180 | 10 | urethane type (10) | K(1) | 1 | P | aluminum | 25 |
| 2 | A | 189 | 10 | none | none | 1 | P | aluminum | 25 |
| 3 | A | 189 | 10 | urethane type (10) | K(1) | none | P | aluminum | 25 |
| 4 | A | 189 | 4 | urethane type (10) | K(1) | 1 | P | aluminum | 25 |
| 5 | A | 189 | 25 | urethane type (10) | K(1) | 1 | P | aluminum | 25 |
| 6 | A | 189 | 10 | urethane type (35) | K(1) | 1 | P | aluminum | 25 |
| 7 | A | 189 | 10 | urethane type (10) | K(15) | 1 | P | aluminum | 25 |
| 8 | A | 189 | 10 | urethane type (10) | K(1) | 0.05 | P | aluminum | 25 |
| 9 | A | 189 | 10 | urethane type (10) | K(1) | 7 | P | aluminum | 25 |
| 10 | A | 189 | 10 | urethane type (10) | K(1) | 1 | none | aluminum | 25 |

TABLE 1-continued

| Comp. Ex. | Production continuity | Blurring | Vividness | Adhesion (without varnish) | Adhesion (after retort) | Overall evaluation |
|---|---|---|---|---|---|---|
| 1 | ⊚ | ○ | ○ | ⊚ | X | X |
| 2 | Δ | Δ | Δ | X | Δ | X |
| 3 | ⊚ | X | X | ⊚ | ⊚ | X |
| 4 | ⊚ | ○ | X | ⊚ | ⊚ | X |
| 5 | X | ○ | ⊚ | ⊚ | ⊚ | X |
| 6 | ⊚ | X | X | Δ | ○ | X |
| 7 | X | Δ | ○ | Δ | ○ | X |
| 8 | ⊚ | X | X | ⊚ | ⊚ | X |
| 9 | ⊚ | X | Δ | ⊚ | ⊚ | X |
| 10 | ⊚ | ○ | ○ | ⊚ | X | X |

*1: Solvent,
*2: Color material,
*3: Thickener,
*4: Surfactant

<Solvents>
* Solvent A: Diethylene glycol diethyl ether (water-soluble, dialkyl glycol ether type)
* Solvent B: Diethylene glycol monomethyl ether (water-soluble, ethylene glycol ether type)
* Solvent C: Dipropylene glycol monomethyl ether (water-soluble, propylene glycol ether type)
* Solvent D: Propylene glycol monomethyl ether (water-soluble, propylene glycol ether type)
* Solvent E: Diethylene glycol monobutyl ether (water-soluble, ethylene glycol ether type)
* Solvent F: Isoparaffin (water-insoluble)

<Coloring material> Carbon black

<Thickeners>
* Thickener K: Ethyl cellulose
* Thickener L: Polyvinyl butylal

<Surfactant> Methyl polysiloxane

<Finishing varnishes>
* Finishing varnish P: Acrylamino type (aqueous)
* Finishing varnish Q: Acrylepoxy type (aqueous)
* Finishing varnish R: Polyester type (aqueous)
* Finishing varnish S: Polyesteramino type (aqueous)
* Finishing varnish T: Ultraviolet ray-curing type

TABLE 2

| Exp. | *1 | B.P. (° C.) | *2 (%) | Binder (%) | *3 (%) | *4 (%) | Finish varnish | Layer on which IJP is effected | Can temp. (° C.) |
|---|---|---|---|---|---|---|---|---|---|
| 1 | A | 189 | 10 | urethane type (10) | K(1) | 1 | P | aluminum | 25 |
| 2 | A | 189 | 10 | urethane type (10) | K(1) | 1 | P | aluminum | 40 |
| 3 | A | 189 | 10 | urethane type (10) | K(1) | 1 | P | aluminum | 80 |
| 4 | A | 189 | 10 | urethane type (10) | K(1) | 1 | P | aluminum | 100 |
| 5 | A | 189 | 10 | urethane type (10) | K(1) | 1 | P | aluminum | 120 |
| 6 | E | 230 | 10 | urethane type (10) | K(1) | 1 | P | aluminum | 25 |
| 7 | E | 230 | 10 | urethane type (10) | K(1) | 1 | P | aluminum | 40 |
| 8 | E | 230 | 10 | urethane type (10) | K(1) | 1 | P | aluminum | 80 |
| 9 | E | 230 | 10 | urethane type (10) | K(1) | 1 | P | aluminum | 100 |
| 10 | E | 230 | 10 | urethane type (10) | K(1) | 1 | P | aluminum | 120 |

| Exp. | Production continuity | Blurring | Vividness | Adhesion (without varnish) | Adhesion (after retort) | Overall evaluation |
|---|---|---|---|---|---|---|
| 1 | ⊚ | ○ | ○ | ⊚ | ⊚ | ○ |
| 2 | ⊚ | ⊚ | ⊚ | ⊚ | ⊚ | ○ |
| 3 | ⊚ | ⊚ | ○ | ⊚ | ⊚ | ○ |
| 4 | ○ | ⊚ | ○ | ⊚ | ⊚ | ○ |
| 5 | X | ⊚ | ○ | ⊚ | ⊚ | X |
| 6 | ⊚ | Δ | Δ | Δ | ○ | Δ |
| 7 | ⊚ | ○ | Δ | Δ | ○ | Δ |
| 8 | ⊚ | ○ | ○ | ○ | ⊚ | ○ |
| 9 | ○ | ⊚ | ○ | ⊚ | ⊚ | ○ |
| 10 | X | ⊚ | ○ | ⊚ | ⊚ | X |

*1: Solvent,
*2: Color material,
*3: Thickener,
*4: Surfactant

<Solvents>
* Solvent A: Diethylene glycol diethyl ether (water-soluble, dialkyl glycol ether type)
* Solvent E: Diethylene glycol monobutyl ether (water-soluble, ethylene glycol ether type)

TABLE 2-continued

<Coloring material> Carbon black
<Thickener>
* Thickener K: Ethyl cellulose
<Surfactant> Methyl polysiloxane
<Finishing varnish>
* Finishing varnish P: Acrylamino type (aqueous)

INDUSTRIAL APPLICABILITY

The ink for ink-jet printing of the invention dries excellently and, therefore, effectively prevents the blurring caused by the flow of ink despite images are printed while rotating the non-absorptive cylindrical container, applicable well for being printed on the cylindrical containers having non-absorptive surfaces, such as seamless cans and tubular containers. Besides, owing to its superiority from the sanitary point of view, the ink for ink-jet printing of the invention can be favorably used for the seamless cans for containing beverages and foods and for the tubular containers for containing seasonings and the like.

Further, since variable images can be formed by the ink-jet printing, the invention is suited for printing a variety of kinds of designs on the seamless cans in small lots.

The invention, further, makes it possible to produce, continuously and inexpensively, the printed cylindrical containers on which the images are printed featuring high resolution and excellent luster, and can be favorably adapted to producing general-purpose articles in large quantity.

The invention claimed is:

1. A method of producing a printed cylindrical container by effecting an ink-jet printing on an ink non-absorptive surface of the cylindrical container by using an ink for ink-jet printing, and applying a finishing varnish on the ink non-absorptive surface, wherein
the ink for ink-jet printing comprises at least a water-soluble solvent, a coloring material selected from the group consisting of an inorganic pigment, an organic pigment and a dye, a surfactant, a thickener and/or a binder resin, the coloring material is contained in an amount of 5 to 20% by weight, the surfactant is contained in an amount of 0.1 to 5% by weight, the thickener is contained in an amount of not more than 10% by weight, and the binder resin is contained in an amount of not more than 30% by weight.

2. The method of producing a printed cylindrical container according to claim 1, wherein said binder resin comprises any one of an urethane resin, an epoxy resin, a polyester resin, a melamine resin or an acrylic resin, and is contained in an amount of 5 to 30% by weight.

3. The method of producing a printed cylindrical container according to claim 1, wherein said water-soluble solvent is at least one of a dialkyl glycol ether solvent, an ethylene glycol ether solvent or a propylene glycol ether solvent.

4. The method of producing a printed cylindrical container according to claim 1, wherein said water-soluble solvent has a boiling point of not lower than 120° C.

5. The method of producing a printed cylindrical container according to claim 1, wherein said thickener is at least one of a cellulose ether soluble in alcohol or a polyvinyl acetal soluble in alcohol.

6. The method of producing a printed cylindrical container according to claim 1, wherein said surfactant is a siloxane modified with polyether.

7. The method of producing a printed cylindrical container according to claim 1, wherein said finishing varnish layer comprises an aqueous finishing varnish using, as the base resin, any one of an acrylepoxy resin, acrylamino resin, polyester resin or polyesteramino resin.

8. The method of producing a printed cylindrical container according to claim 1, wherein a white coating and/or an anchor coating is formed under the ink-jet-printed layer.

9. The method of producing a printed cylindrical container according to claim 1, wherein the image that is ink-jet-printed is false-baked before applying the finishing varnish and, thereafter, the finishing varnish that is applied is baked and cured.

10. The method of producing a printed cylindrical container according to claim 1, wherein the image is printed by the plate-type printing before or after the ink-jet printing.

11. The method of producing a printed cylindrical container according to claim 1, wherein the ink-jet printing is effected through at least one ink-jet printing station in which a plurality of ink-jet heads are arranged.

12. The method of producing a printed cylindrical container according to claim 1, wherein the temperature on the ink non-absorptive surface of the cylindrical container is adjusted to lie in a range of 25 to 100° C. before the inkjet printing on the ink non-absorptive surface.

* * * * *